Sept. 17, 1940.  H. P. HOOD ET AL  2,215,039
METHOD OF TREATING BOROSILICATE GLASSES Original Filed March 19, 1934

INVENTOR.
HARRISON PORTER HOOD
AND MARTIN EMERY NORDBERG
ATTORNEYS.

Patented Sept. 17, 1940

2,215,039

UNITED STATES PATENT OFFICE 2,215,039

METHOD OF TREATING BOROSILICATE GLASSES

Harrison Porter Hood and Martin Emery Nordberg, Corning, N. Y., assignors, by mesne assignments, to Corning Glass Works, Corning, N. Y., a corporation of New York Original application March 19, 1934, Serial No. 716,418. Divided and this application September 20, 1934, Serial No. 744,818

16 Claims. (Cl. 49—79)

We have discovered that glass compositions in a certain region of the ternary system—$R_2O$—$B_2O_3$—$SiO_2$—will, on the proper heat treatment, separate into two phases, which separation generally is evidenced by the appearance of a slight bluish opalescence in the glass; that one of these phases is very rich in silica, hereinafter called the insoluble phase, and the other phase is very rich in alkali and boric oxide, hereinafter called the soluble phase; that the soluble phase is soluble in acids and may be leached out of and away from the insoluble phase, leaving the latter in a rigid cellular structure which maintains the original shape of the initial glass and which is permeable to water; that further leaching or washing in pure water further purifies the insoluble phase; that the article thus obtained, consisting of the highly silicious insoluble phase, can be heated slowly to dehydrate it and can subsequently be revitrified by heating to 900° C. or above to yield a transparent homogeneous article having a composition of approximately 5% $B_2O_3$, .5% $R_2O$, and the balance silica.

The several steps involved in the above outlined method of treating the selected borosilicate and the products obtained thereby are, we believe, novel, and form the matters to be herein claimed.

In the accompanying drawings we have shown triaxial diagrams representing certain ternary systems.

Figure 1:
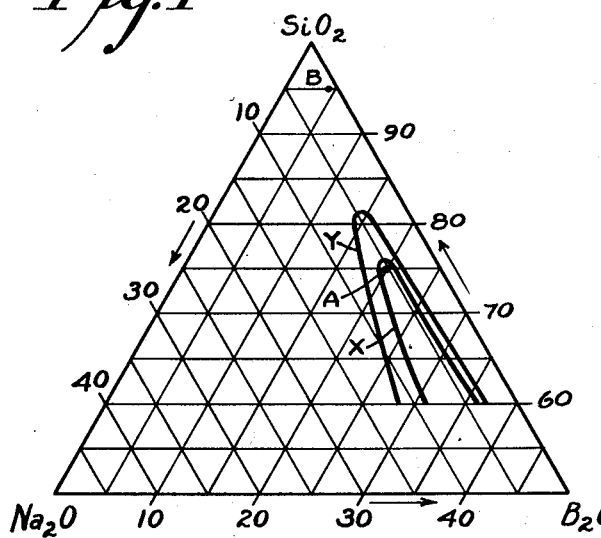

Figure 1 is the diagram of the

$Na_2O$—$B_2O_3$—$SiO_2$ system.

Figure 2:
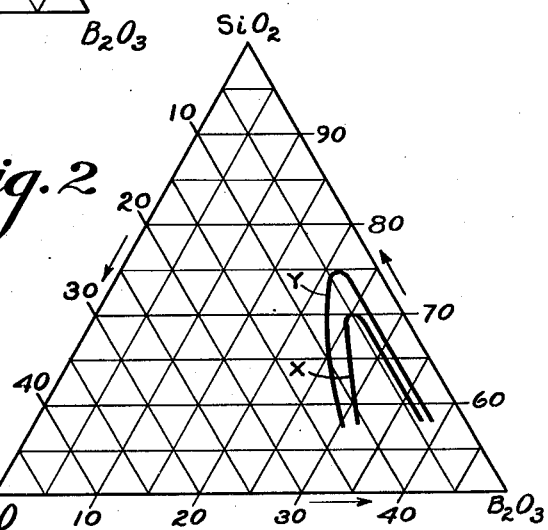

Figure 2 is the diagram of the

$K_2O$—$B_2O_3$—$SiO_2$ system.

Figure 3:
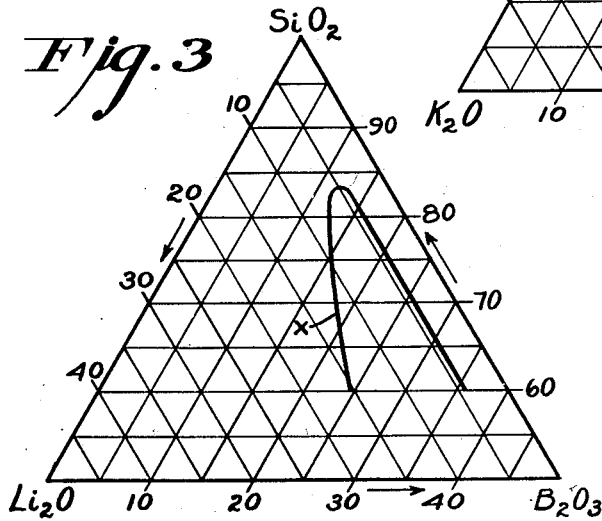

Figure 3 is the diagram of the

$Li_2O$—$B_2O_3$—$SiO_2$ system.

In practicing our invention we select a glass of a composition governed by considerations which will hereinafter more fully appear in a discussion of the ternary system—

$R_2O$—$B_2O_3$—$SiO_2$

A glass which we have found to be suitable for our purpose has the composition of 75% $SiO_2$, 5% $Na_2O$, and 20% $B_2O_3$. The selected glass is melted in the usual manner, preferably in a tank furnace, or in such a manner as to produce the most homogeneous melt possible, and it is then fabricated in the usual way into the desired articles, such as beakers, flasks, tubes, dishes, sheets, and the like.

The glass is then subjected to a heat treatment which, to some extent, will depend upon the composition chosen but which, for the above recited composition, preferably comprises heating the glass for three days at a temperature of 525° C. Practically the same result may be accomplished by heating at a higher temperature for a shorter time—say 600° C. for a few hours—or by heating at a still lower temperature for a longer period of time. The choice of heat treatment will also depend upon the rate at which the original article cooled during fabrication and, with wall thicknesses of 4 to 6 mm., best results with least subsequent breakage are obtained with a heat treatment at 600° C. to 650° C. for two hours or less, whereas in the case of thin ware, these results are obtained at about 525° C. for a few days. The heat treatment, if properly carried out, will cause the glass to become more or less completely separated into two distinct phases, one of which is very rich in boric oxide and alkali and is soluble in acids, and the other of which is very rich in silica and is insoluble in acids, as is mentioned above. The glass at this stage of the process may be characterized by a more or less pronounced bluish opalescence, due to the separation of the phases.

After the glass has been heat treated and annealed, it is immersed in an acid bath comprising preferably three normal hydrochloric acid or a solution having a hydrogen ion concentration equivalent thereto, such as five normal sulphuric acid, the bath being held preferably at a temperature of approximately 98° C. We have also carried out the acid treatment at room temperature and at temperatures and pressures obtainable in an autoclave. The glass is kept immersed in the acid bath for a length of time, which depends on the temperature of the bath and the thickness of glass to be leached. We have found that at a temperature of 98° C. this length of time will approximate one day for each millimeter of glass, i. e., an article which is 2 mm. thick will require about two days immersion for complete penetration of the acid, but a longer immersion than that necessary to accomplish this will do no harm. The acid treatment, if properly carried out, will cause complete solution of the soluble phase. At the conclusion of this step in the process the articles are more sensitive to thermal shock than before and care must be taken to avoid sudden temperature changes.

Instead of leaching out the soluble phase completely, it may be desirable, for some purposes, to carry the acid leaching only to a definite depth, leaving the interior portion of the glass unaffected. In this case the acid leaching is stopped when the desired depth is reached, a condition which is readily ascertained by examination of the edge of the article. In articles thus treated there is a tendency to break during the subsequent dehydration and vitrification steps, due to the strains established between the outer leached or hydrated layer and the interior unchanged portion during subsequent heating, but, nevertheless, we have successfully accomplished this partial leaching and vitrification with articles in the form of small plates.

After the acid treatment, the glass is washed to remove all traces of the soluble phase and also any soluble impurities, such as iron, which have been acted on by the acid. Washing may be accomplished by immersing the glass for ten or twelve hours in pure running water in such a manner as to expose all leached sides of the glass to the action of the water. It is believed that the removal of the soluble phase leaves the silica phase as a rigid and porous gel-like structure. This structure retains the original shape of the article and may be handled without breaking but readily takes up grease and other foreign materials, which may leave a mark on the finished article. It is best to avoid handling the article with the bare hands at any time during the process.

After the article has thus been leached and washed, it is subjected to a vitrifying heat treatment in order to dehydrate it and to convert the cellular structure to a non-porous vitreous condition. During dehydration the article becomes white or opalescent but develops transparency as the temperature is raised to the neighborhood of 900° C. When complete transparency is attained, vitrification is complete. Heat should be applied with sufficient slowness for the first few hundred degrees, so that the article may not be shattered by a too sudden evolution of water. The temperature is carried to a maximum of 900° C. to 1000° C., at which it is held for a short time. Higher temperatures may be used, provided the article is supported on a form to prevent distortion in shape. The vitrified article may then be cooled rapidly, even to the extent of quenching it in cold water, because it is now composed of almost pure vitreous silica and contains only about 5% $B_2O_3$ and about .5% $Na_2O$. An ultimate volume shrinkage occurs which, in the case of a glass of the above recited preferred composition, is found to amount to about 20%.

If desired, the subsequent step of revitrification may be omitted and the porous structure of the article may be retained, thus making it useful for a variety of purposes, such as semi-permeable membranes, supports for catalysts of various kinds, etc.

During initial fabrication of the article from the original glass composition, a certain amount of volatilization of boric oxide and alkali from the hot gather occurs. This causes a surface layer of slightly different composition, which is less susceptible to the above described method of treatment. This thin layer may act as a protecting film and prevent the reaction in the acid bath. To remove this film, we have found it desirable to subject the article to a short etching treatment, which comprises dipping the article into a dilute solution of hydrofluoric acid. The etching may be carried out either before or after the heat treatment step. The final product will have a better appearance when the etching precedes the heat treatment, but occasionally the heat treatment itself causes a volatilization at the surface and the formation of the objectionable protecting film. In this case, however, a subsequent milder etching is sufficient to remove the layer since it is usually thinner than that which is formed at the higher temperatures during the initial fabrication of the article. The volatilization, which tends to occur during the heat treatment step, may be prevented by maintaining in the atmosphere of the heating chamber a proper concentration of boric oxide and alkali oxide vapors. This, however, may result in the formation of a protecting film by addition of these constituents to the surface layer.

Oxides, such as the oxides of iron and cobalt, have been found to concentrate mainly in the soluble phase during the heat treatment and the separation of phases which takes place therewith. Such oxides are therefore practically entirely removed during the acid leaching step of the process. Therefore proper glasses treated in accordance with our process have a high transmission for ultra-violet radiation, even though prepared from iron-bearing batch materials.

The following theoretical considerations are also of value for the proper understanding of our invention:

In carrying out our invention, the viscosities involved at temperatures below 750° C. are such that the separation does not take place quickly in the usual form of an emulsion or system of droplets dispersed in a second phase but separates into a continuous thread-like structure of the soluble phase embedded in the insoluble phase. The soluble phase, being of a continuous nature, can be entirely removed from the insoluble phase. When this is done, a rigid porous structure of the original glass shape is left after the soluble phase is leached out. After washing and drying, this porous structure can be heated until the viscosity of the silica rich glass decreases to such a point that surface tension forces surrounding the pores are sufficient to cause a collapsing of the porous channels, driving out what gases may be contained within them, thus resulting in a completely transparent solid glass of zero porosity. During this operation the original shape of the glass article is retained, though a shrinkage in dimensions occurs corresponding to a volume loss which is equivalent to that of the removed phase, namely, about 20% with the glass of the above composition. This final glass possesses all the properties of the glass which would result from making by the usual processes of melting and working a glass of the same composition, if such a thing were possible.

Ordinary crystallization or devitrification, which is the usual type of phase separation that takes place upon the heat treatment of glasses, should not be confused with the above described separation of phases which we have discovered. The crystalline phase, which would separate by ordinary devitrification from our preferred compositions, consists of one of the high temperature forms of silica and the liquidus for this phase is around 1000° C. and varies according to the composition selected. The forces, which tend to cause this crystallization, increase as the temperature of the glass is decreased from this point and when crystallization has once been initiated, it cannot be reversed; that is, the crystals cannot be redissolved at any temperature below the liquidus. However, the separation of phases which we have discovered appears only below a liquidus of about 750° C. and can be made to disappear or revert to miscibility above its liquidus of about 750° C. but below 1000° C. Between 750° C. and 1000° C. only devitrification can take place, whereas below 750° C. both devitrification and the separation into two immiscible phases can take place. Due to the high viscosities which are involved, devitrification below 750° C. is decidedly slower than the separation which is due to the immiscibility of two glasses.

Obviously, heat treatments have a decided bearing upon the shape, size, and number of the pores or channels in which the soluble phase forms. If held too long at the higher temperatures, the ability of the soluble phase to leach out disappears. It is believed in this case that the channels are replaced by droplets due to the action of surface tension forces as the viscosities are decreased. On the other hand, temperatures below 500° C. are of little value for our purpose, since in this case the viscosities are too high to permit of a separation that can be of value for this process.

The previous thermal history of a glass has a bearing upon the heat treatment which may be required for best results. Articles which are thicker than 4 to 6 mm. receive some heat treatment in normal working and cooling so that the additional heat treatment required may be different from that required by thin walled blown ware which was cooled more quickly during manufacture.

The concentration of acid has a decided bearing upon the rate of penetration, or leaching out, of the soluble phase. Acid solutions which are either too weak or too strong cause, at the most, very slow penetration. The maximum rate of decomposition of the soluble phase occurs when the hydrogen ion concentration of the leaching solution is aproximately that of a 3 normal solution of hydrochloric acid.

As the soluble phase is removed, the pores become filled with acid solution in place of glass and the capillary forces existing under these conditions cause a swelling of the layer. As the hydration or leaching process continues, this swelled layer becomes thicker and the remaining inner untreated glass layer becomes correspondingly thinner and is put under tension, which may become so great that cracking results. This fault may be controlled through the proper adjustment of original composition, heat treatment and rate of leaching, and varies somewhat with the type of ware being treated. The strain pattern that is set up during hydration or leaching is of the rectangular type, that is, the nearly constant compression in the hydrated layer suddenly reverses and becomes a nearly uniform tension across the untreated layer.

As an aid in avoiding these difficulties, it has been found advantageous to use an acid solution saturated with ammonium chloride during the hydration step of the process. Other salts behave in a similar way in reducing the swelling and the corresponding strains which are set up in this step. This may be explained by assuming that the concentration of water in the acid solution has been reduced, which in turn reduces the amount of water adsorbed by the silica structure and the swelling caused thereby.

In Figs. 1, 2 and 3 a curve, X, outlines an area, hereinafter called the "X" area, that includes, for the most part, the compositions in which a separation into two phases occurs so rapidly that the heat treatment which they receive during normal fabrication into ware is usually sufficient to cause the separation necessary for hydration.

In Figs. 1 and 2 another curve, Y, outlines an area, hereinafter called the "Y" area, which lies between the curves X and Y. The "Y" area includes, for the most part, the field of compositions which will separate into two phases when heat treated at about 600° C., and can then be hydrated or leached. At a lower temperature this area enlarges somewhat, although this is of theoretical rather than of practical interest, because the glasses which are nearest the boundary curve Y leach slowly and are not particularly suitable for the hydration step of the process.

In the sytem $Li_2O$—$B_2O_3$—$SiO_2$, which is illustrated in Fig. 3, practically all compositions which are suitable for our purpose can be hydrated or acid leached without any specific heat treatment other than the heat treatment which occurs in the normal fabrication of the glass into ware. Such compositions lie within the "X" area in Fig. 3. Therefore, in this system there is practically no field of compositions which require a subsequent definite heat treatment to cause a separation of phases suitable for our purpose and no curve is shown in Fig. 3 to correspond with curves Y in Figs. 1 and 2.

In Figs. 1, 2 and 3 no boundary is shown for minimum silica content, because compositions below the areas illustrated do not yield a sufficiently large amount of the silica rich phase to leave a structure which is strong enough to hold together after the leaching step.

In Fig. 1, the point A represents the glass composition which has hereinbefore been taken as a typical glass. The insoluble phase into which this glass will separate on the proper heat treatment is represented by the point B. The other phase, containing only about 10% of silica, would be represented by a point (not shown) which lies on the continuation of a straight line, or the tie line, passing through the points A and B.

The same reasoning may be applied to the systems represented in Figs. 2 and 3, although not specifically pointed out and illustrated therein by definite compositions.

An inspection of the composition diagrams shows that, if we let K represent the excess percentages of silica over the minimums specified, we have the following:

That with soda as the alkali the silica content of the glasses in the "Y" area may vary from a minimum of 60% to a maximum of 82%; the alkali may vary from a percentage of 11% minus 0.25 K to a percentage of 3% plus 0.05 K; and the boric oxide may vary from a percentage of 29% minus 0.75 K to a percentage of 37% minus 1.05 K.

That with potash as the alkali the silica content of the glasses in the "Y" area may vary from a minimum of 58.0% to a maximum of 77%; the alkali may vary from a percentage of 12% minus 0.40 K to a percentage of 3.25%, and the boric oxide may vary from a percentage of 30.0% minus 0.60 K to a percentage of 38% minus 0.95 K.

That with soda as the alkali the silica content of the glasses in the "X" area may vary from a minimum of 60% to a maximum of 76%; the alkali may vary from a percentage of 9% minus 0.19 K to a percentage of 4% plus 0.037 K; and the boric oxide may vary from a percentage of 31% minus 0.81 K to a percentage of 36% minus 1.04 K.

That with potash as the alkali the silica content of the glasses in the "X" area may vary from a minimum of 58.0% to a maximum of 70%; the alkali percentage may vary from a percentage of 10.5% minus 0.4 K to a percentage of 4%; and the boric oxide may vary from a percentage of 32% minus 0.65 K to a percentage of 38% minus K.

That with lithia as the alkali the silica content of the glasses in the "X" area may vary from a minimum of 60% to a maximum of 82.5%; the alkali percentage may vary from a percentage of 15% minus 0.375 K to a percentage of 4%; and the boric oxide may vary from a percentage of 24.5% minus 0.6 K to a percentage of 35.5% minus K.

A marked similarity in action of the several oxides may be noticed from the above. In each of the two "Y" areas given the minimum alkali content is substantially constant irrespective of the silica content and amounts to about 3.5%, while the maximum alkali content is substantially the same at 60% silica, decreasing ¼% for each percentage of K in the case of soda and ½% in the case of potash. Likewise, in both the soda and potash glasses the maximum boric oxide content is substantially the same, amounting to about 37% at 60% silica and decreasing almost percentage for percentage as the silica increases, while the minimum boric oxide content is likewise practically the same at 60% silica and decreases at about .7% for each increase of 1% in the silica.

Considering the "X" areas, a similar relation exists. The minimum alkali content is about 4%; the maximum alkali content for 60% silica is substantially the same, namely, 9.5%, decreasing in the case of the potash at a higher ratio with the increase of silica than does the soda. Lithia shows a higher permissible alkali content but varies with the alkali in the same ratio. The minimum boric oxide content in all cases is practically 36% at 60% silica and decreases percentage for percentage with the rise of silica. Both the soda and potash show about the same maximum of boric oxide at 60% silica and this percentage decreases as the silica rises in substantially the same relation. Lithia shows a lower permissible high percentage, namely, 24.6%, but it varies with the silica in the same way as do the soda and potash.

Also considering both of the "Y" areas, it will be found that the upper limit of alkali content is 11.5% less G times the deficiency of the boric oxide under 30%, G being equal for soda to 0.37, and for potash to 0.65; and that the boric oxide content is between the limits of 29%—0.6D and 39%—D, D being the excess of silica over 60%.

Also considering the "X" areas it will be found that the upper limit of the alkali content is E—G times the deficiency of the boric oxide under 32%, E being equal, when the alkali is soda, to 9%, when potash to 10.5%, and when lithia to 15.5%, and G being equivalent for soda to 0.35, for potash to 0.64, and for lithia to 0.38; and the boric oxide content is between the limits of C%—F×D, and 36%—D, C being when the alkali is soda or potash equivalent to 31%, and when lithia to 24.5%, and F being 0.85 when the alkali is soda, 0.75 when potash, and 0.6 when lithia, D being the excess of silica over 60%.

The ternary systems, which are represented in Figs. 1, 2 and 3, have also been used as a base for the addition of fourth components. Such additions usually require some modification of the alkali to boric oxide ratio and although quite a large number of these four component glasses have been made, they have not constituted any improvement over the three component glasses. For certain purposes there may be an advantage in having an added oxide in the final glass, and hence we do not wish to be limited to merely the three component systems. The presence of alumina decreases the rate of hydration or leaching, and glasses containing 2.5% or more of alumina will hydrate extremely slowly, if at all. Where a fourth constituent is present, it is very apt to concentrate in the soluble phase.

It is to be understood that the insoluble phase, after being freed from the soluble phase, is usually glass-like and vitreous in appearance, but is submicroscopically porous in structure. This porous structure becomes non-porous when suitably heated and we have used the term "vitrifying" for lack of a better term to designate the step of changing the porous structure to a non-porous structure by heating.

In the following claims we use the term "heat treatment" (unless otherwise restricted), insofar as it refers to the separation of the glass into two phases as including either the effects of the heat of fabrication when sufficient for the purpose stated or including a separate and independent heat treatment following fabrication.

In such claims, also, the term "dissolving out one of the phases", or equivalent expressions, includes not only the complete removal of the soluble phase but the removal of such phase in certain layers of the treated glass.

By a "relatively large percentage of boric oxide", we mean any percentage of boric oxide over 14%.

The term "R₂O" means any one of the three alkalies—Li₂O, Na₂O, and K₂O, or combinations thereof.

This application is a division of our co-pending application, Serial Number 716,418, filed March 19, 1934, which has matured into Patent 2,106,744, dated February 1, 1938.

We claim:

1. The hereinbefore described process, which consists in melting a glass, fabricating the same into a fixed shape, thereafter separating such glass substantially throughout its mass into two glass phases by heat treatment in addition to that resulting from its fabrication, and then dissolving out one of the phases while leaving the other phase undissolved.

2. The hereinbefore described process, which consists in melting a glass, fabricating the same into a fixed shape, separating such glass into two phases by heat treatment, and dissolving out one of the phases and vitrifying the other phase by heat.

3. The hereinbefore described process, which consists in melting a glass, fabricating the same into a fixed shape, separating such glass into two phases by heat treatment, and dissolving out one of the phases and vitrifying the other phase by heat without destroying the shape thereof.

4. The hereinbefore described process, which consists in melting a glass, fabricating the same into a fixed shape, thereafter separating such glass into two phases by heat treatment in addition to that resulting from its fabrication, and then dissolving out one of the phases and vitrifying the other phase by heat without destroying the shape thereof.

5. The hereinbefore described process, which consists in melting a glass rich in boric oxide and silica and containing a relatively small percentage of alkali, fabricating the same into a fixed shape, separating the glass into two phases by heat treatment and then dissolving out one of the phases and vitrifying the other phase by heat.

6. The hereinbefore described process, which consists in melting a glass rich in boric oxide and silica and containing a relatively small percentage of alkali, fabricating the same into a fixed shape, separating the glass into two phases by heat treatment and then dissolving out one of the phases and vitrifying the other phase by heat without destroying the shape thereof.

7. The hereinbefore described process, which comprises melting a glass rich in boric oxide and silica and containing a relatively small percentage of alkali, fabricating the same into a fixed shape, then subjecting the shaped article to a heat treatment other than that resulting from its shaping until it separates into two phases, and dissolving out one of the phases and vitrifying the other phase by heat without destroying the shape thereof.

8. The hereinbefore described process of producing shaped articles, which comprises shaping an article from glass containing boric oxide and an alkali, subjecting the shaped article to heat treatment, extracting from the glass of the heat treated article some of the boric oxide and alkali without destroying the shape of the article and then vitrifying the residue left after such extraction.

9. The hereinbefore described process, which comprises melting a glass containing approximately 75% silica, 20% boric oxide, and 5% soda, fabricating the same into a fixed shape, removing the surface of the fabricated glass, heat treating the fabricated glass at between 500° C. to 750° C. until it separates into two phases, leaching the heat treated glass in an acid bath containing salts in solution to dissolve out one of the phases, washing the remaining phase and heating such washed phase to a vitrifying temperature without destroying its shape.

10. The hereinbefor described process, which comprises melting a glass containing a relatively large percentage of boric oxide, fabricating the same into shape, removing the surface of the fabricated glass, heat treating the fabricated glass until it separates into two phases, and leaching the heat treated glass in an acid bath to dissolve out one of the phases.

11. The hereinbefore described method of producing bodies of high silica content which comprises melting a glass of lower silica content, forming the molten glass into a desired shape, extracting a substantial part of the alkali contents of the initial glass without destroying the shape of the article, and submitting the skeleton left by the extraction to a degree of heat at least sufficient to bind the skeleton together.

12. The hereinbefore described method of producing bodies of high silica content which comprises melting a glass of lower silica content, forming the molten glass into a desired shape, extracting a substantial part of the alkali contents of the initial glass without destroying the shape of the article, and submitting the skeleton left by the extraction to a degree of heat at least sufficient to cause incipient vitrification.

13. The hereinbefore described method of producing bodies of high silica content which comprises melting a glass of lower silica content, forming the molten glass into a desired shape, extracting a substantial part of the non-siliceous constituents of the initial glass without destroying the shape of the article, and submitting the skeleton left by the extraction to a degree of heat at least sufficient to bind the skeleton together.

14. The hereinbefore described method of producing bodies of high silica content which comprises melting a glass of lower silica content, forming the molten glass into a desired shape, extracting a substantial part of the non-siliceous constituents of the initial glass without destroying the shape of the article, and submitting the skeleton left by the extraction to a degree of heat at least sufficient to cause incipient vitrification.

15. The hereinbefore described process which consists in melting a glass, fabricating the same into a fixed shape, heat treating such glass until it separates into two phases substantially through its mass, one of which phases being more easily soluble than the other, and then treating such glass with a solvent which is capable of dissolving the more easily soluble phase only, to substantially completely dissolve out the more easily soluble phase leaving the other phase undissolved.

16. The hereinbefore described process which comprises melting a glass rich in boric oxide and silica and containing a relatively small percentage of alkali, fabricating the same into a fixed shape, separating the glass substantially throughout its mass into two glass phases by heat treatment, and then dissolving out one of the phases while leaving the other phase undissolved.

HARRISON PORTER HOOD.
MARTIN EMERY NORDBERG.